Patented Dec. 13, 1949

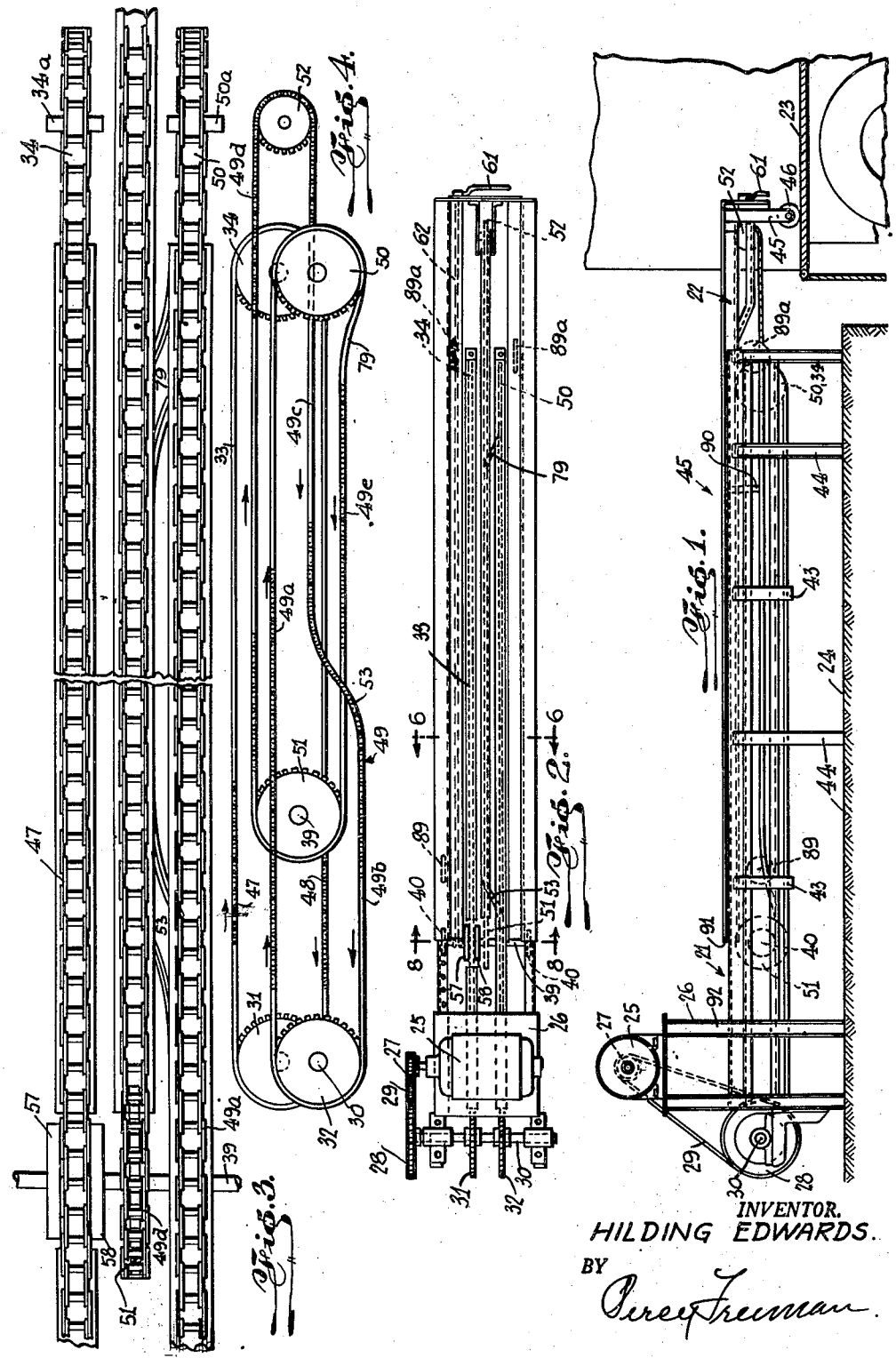

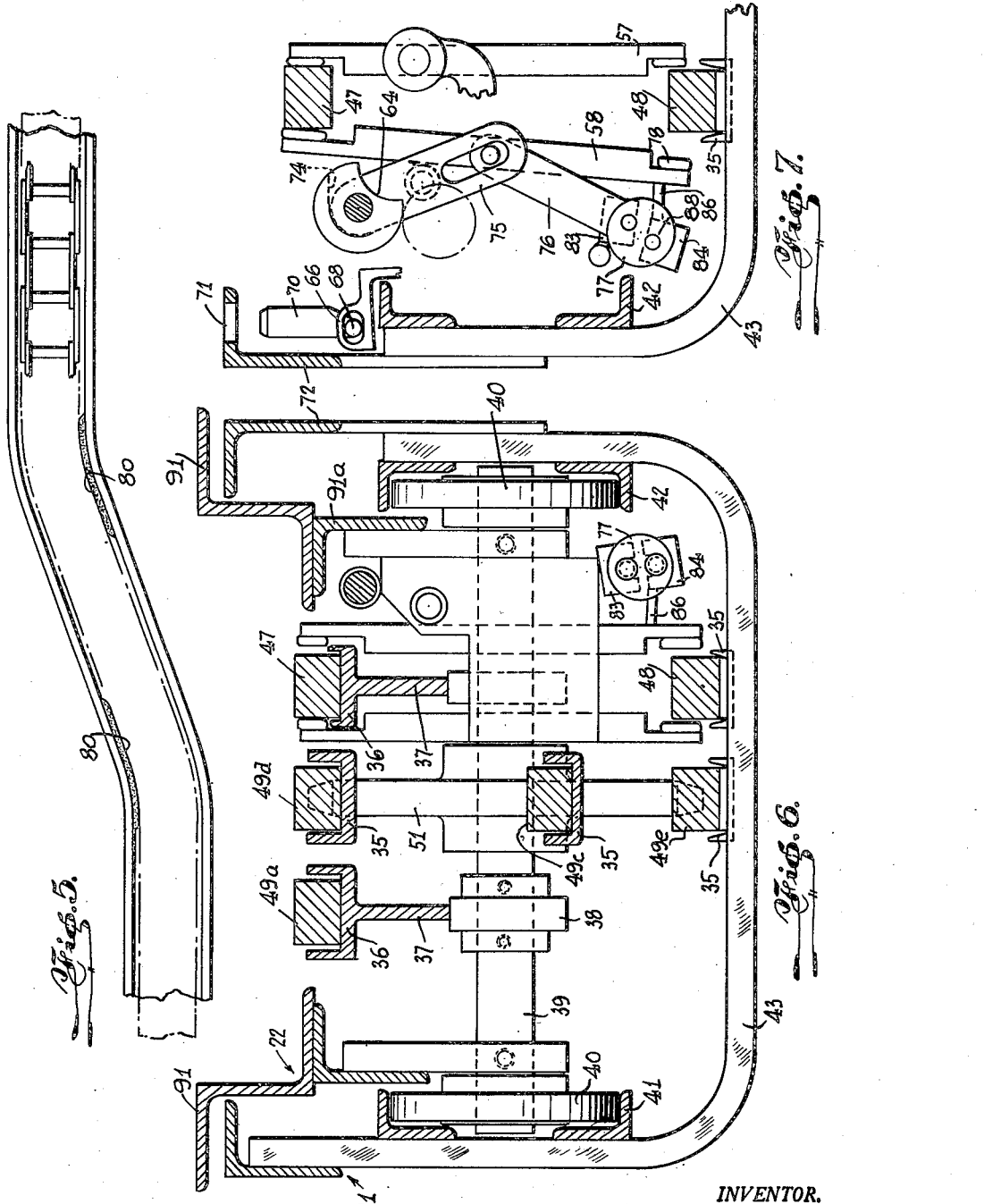

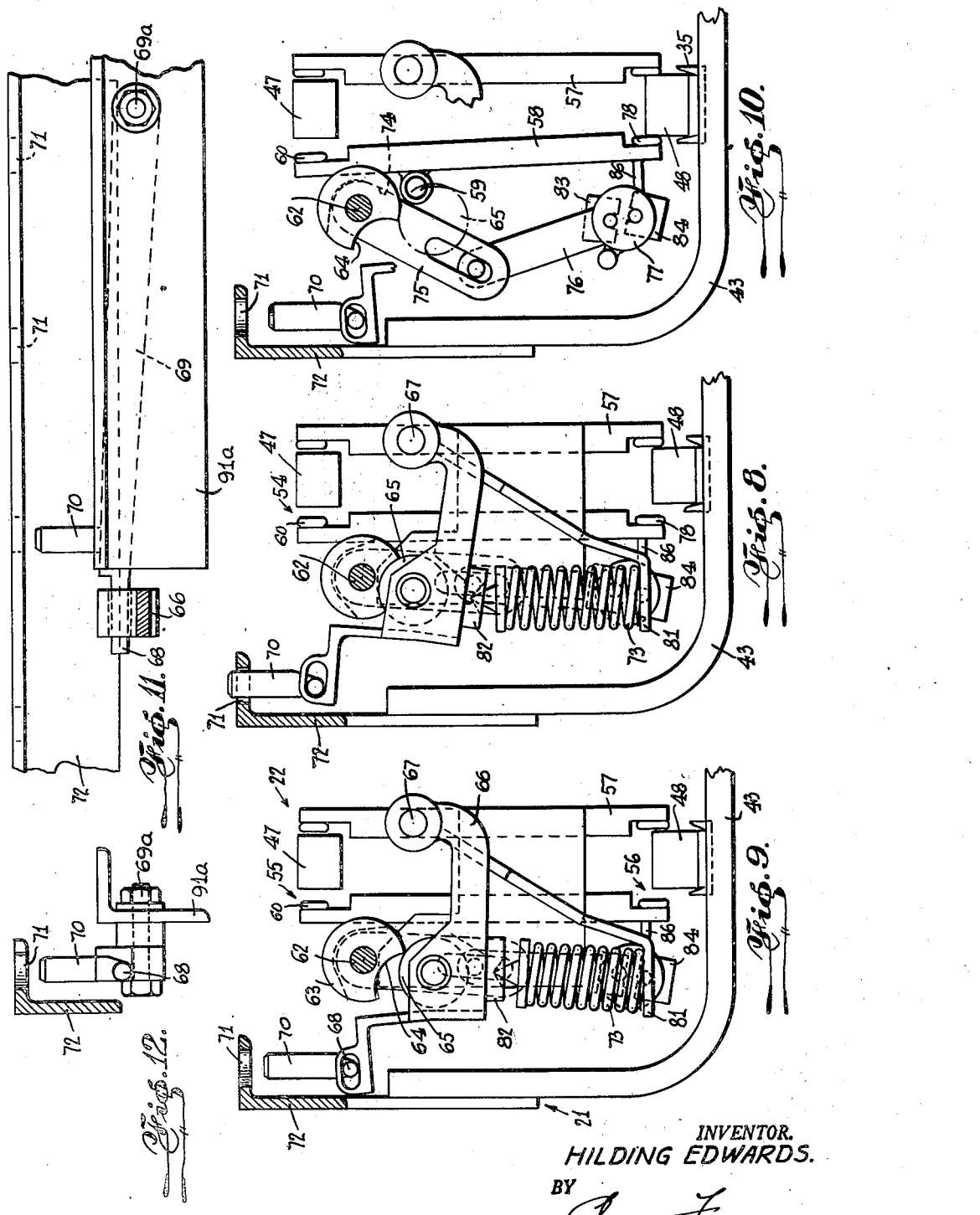

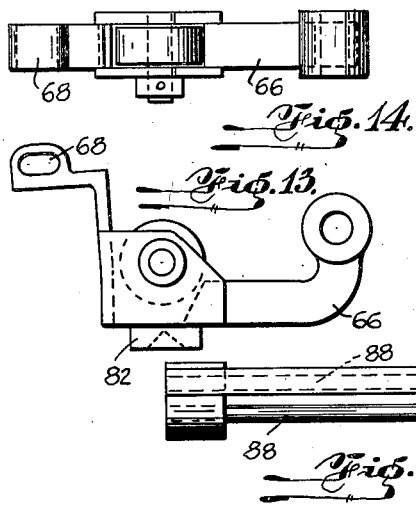

2,491,255

UNITED STATES PATENT OFFICE 2,491,255

EXTENSIBLE LOADER CONVEYER

Hilding Edwards, Yonkers, N. Y.

Application May 19, 1947, Serial No. 748,939

4 Claims. (Cl. 198—139)

This invention relates to new and useful improvements in loading conveyors and particularly constitutes an improvement over the invention shown in my U. S. Patent No. 2,150,241, issued March 14, 1939, entitled "Loader conveyor."

An object of the invention is to provide a simple, durable, efficient device whereby the operator can load and unload a truck with a minimum of time and physical effort.

A further object is to provide a simple and efficient device whereby an extensible portion of the conveyor can, by simple manipulations, be moved to follow the loading point within the truck whether the truck is being loaded or unloaded, and without reversing the drive of the conveyor on the stationary portion.

A still further object is to provide mechanism whereby the above operations can be achieved with ease, with a minimum number of simple rugged mechanical elements capable of continued and long use with a minimum necessity of repair or replacement.

Further and more specific objects, features, and advantages will more clearly appear from the detailed specification hereinafter set forth especially when taken in connection with the accompanying drawings which illustrate a present preferred form which the invention may assume and which form part of the specification.

In very brief and general terms, the invention includes conveyor frames, one fixed and the other movable longitudinally relative thereto, the movable frame being slidably supported on the fixed frame. A drive chain is disposed on the stationary frame, and a carrier or extension chain on the movable frame. Means on the movable frame is manipulatable or operable under the control of the loader to cause either run of the drive chain to be gripped at will to move the extension frame forward or back into and out of a truck being loaded or unloaded.

The invention further includes a carrier chain extending between sprockets on the main or stationary frame, and passing around spaced sprockets on the movable frame in a tortuous path so that as the movable frame is moved one way or the other, the relation of the carrier chain to its engaged sprockets remains unchanged by and during this movement.

In other terms, there are two sprockets on the movable frame over which the carrier chain passes, and they are disposed on opposite sides of a sprocket on the fixed frame, over which sprocket the carrier chain also passes. The zigzag path of the chain between these sprockets is such that the length of the chain between them is always the same even though the sprockets on the movable frame change their position with respect to the sprocket on the fixed frame since the sum of the distances between the sprockets on the movable frame and sprocket on the fixed frame, is always the same whether the movable frame is advancing or receding.

More particularly, the invention includes cam means on the movable frame manipulatable to operate movable jaws into and out of contact with either the upper or lower run of the main drive chain on the fixed frame whereby the movable frame with the carrier chain may be retracted or extended at will without changing the direction of drive of the main drive chain.

The preferred present form of the invention is shown in the drawings, of which:

Fig. 1 is a side elevation of the conveyor.

Fig. 2 is a top plan view of the conveyor.

Fig. 3 is a top plan view, enlarged, of portions of the two chains.

Fig. 4 is a perpective diagrammatic view of the two chains and their relations to each other and to the sprockets involved.

Fig. 5 is a top plan view of a means for guiding the extensible chain from one track to another.

Fig. 6 is a vertical cross section taken on the line 6—6 of Fig. 2.

Figs. 7 to 10 inclusive, are cross-sectional views taken on the line 8—8 of Fig. 2, showing the clamping mechanism in various operating positions.

Figs. 11 and 12 are front and end views of the carriage locking mechanism.

Figs. 13 to 20 inclusive, are detail views of some of the essential parts.

Referring now merely to the specific construction and operation of the preferred form illustrated, it will be seen that the device comprises a stationary conveyor frame 21, and an extensible conveyor frame 22 which is extensible and retractable so as to be moved into and along within the body of a truck 23 while the main frame 21 rests upon a loading platform 24 (see Fig. 1). Of course, the main frame 21 may be mounted on rollers (not shown) so as to be moved about, as desired.

To drive the conveyor chains, there is provided a motor 25 mounted on a pedestal 26 connected to the main frame 21 and having a sprocket 27 driving a sprocket 28 by means of a chain 29. The sprocket 28 is fixed to a drive shaft 30 to which are fixed drive sprockets 31 and 32.

Sprocket 31 drives the main or projecting chain 33, the other end of which passes around a sprocket 34 rotatably supported at the other end of the main frame 21. This chain acts to convey goods along the main conveyor frame 21 and as well acts to project the extensible conveyor frame 22 in a manner to be described.

Referring to Fig. 6, it will be noted that all chains are supported in channels 35. Channels 35 have ribs 37 which ride on pulleys 38 for support, these pulleys are mounted on a shaft 39 which has wheels 40 at each end riding in tracks 41 and 42 supported on yokes 43, some of which 44 have legs thereon, whereby the yokes rest on the conveyor platform 24. It will also be noted that the forward end of the extensible conveyor frame 22 is provided with a dependent leg 45 on the lower end of which is disposed a wheel 46 resting on the floor of the truck 23 and permitting this frame 22 to be easily rolled along the floor of the truck, as it is advanced into or drawn back along the floor.

With reference to the perspective in Fig. 4, it will be seen that the main drive chain 33 has an upper run 47 and a lower run 48. It will also be seen that the chain sprocket 32 carries the extensible chain 49. This carrier chain 49 passes along its upper run around a sprocket 50 rotatably mounted on the main frame 21 at its forward end and then is shunted laterally along its lower run out of the plane of sprockets 32 and 50 into the plane of a sprocket 51 which is rotatably mounted on the shaft 39. The chain 49 passes around this sprocket 51 and along its upper run extends to a sprocket 52 at the outer end of the extensible frame 22 and around the same and at a point 53 (Fig. 3) is shunted laterally back to the plane of the sprocket 32 around which is passes to resume its path. It will be noted that between the sprockets 50, 51 and 52, the chain 49 travels back and forth a somewhat zig-zag path to form a reversed loop around the sprockets on the extensible frame. If this frame is caused to move back and forth, the chain formation permits this by reason of the fact that the distance change between the sprockets 50 and 51 is counterbalanced by the change in distance between the sprockets 50 and 52, so that the over-all length of the chain between these sprockets remains the same whatever the position of the frame 22. The chains 33 and 49 are, of course, in constant motion as long as the motor 25 is in operation.

In order to move the frame 22, there is provided means on the frame 22 which is operated to grip a run of the drive chain 33 so as to move the carriage or frame 22 back or forth, depending upon whether the upper or lower run of the chain is gripped. This mechanism is shown in detail particularly in Figs. 7 to 10 inclusive. This mechanism is generally indicated by the numeral 54 and forms a means to frictionally engage either the upper or lower run of the drive chain 33. This mechanism is mounted on the movable frame 22 and has two sets of jaws 55 and 56. A jaw plate 57 is stationary while a jaw plate 58 is fulcrumed at 59. Liners 60 are provided on the jaws to increase the contact. The plate 58 is swung back and forth around its pivot point so as to engage the upper or lower end with the chain 33. Thus the run of the chain is gripped between the pair of upper or lower jaws as the case may be.

The gripping action is achieved by turning a handle 61 at the outer end of the frame 22 and this handle turns a telescopic rod 62 extending back to the plane of section of Fig. 8, where it has on its end a disc 63 having a cut-out 64 which normally fits into and rests on wheel 65. This wheel is disposed on an arm 66 fulcrumed at 67. When the rod is turned clockwise, as in Fig. 9, from the normal position shown in Fig. 8, it will cause the disc 63 to depress the wheel 65 and, therefore, the arm 66. The arm 66 is connected at 68 to the swinging lock bar 69 which is swung, therefore, to lower the lock pin 70 from any one of a series of holes 71 in the stationary angle member 72 of the main frame 21. This action unlocks the frame 22 from the frame 21.

At the same time, this action of turning the rod 62 causes an engagement between the lower run 48 of the drive chain 33 and the set of jaws 56 by the following action: A spring 73 pressing always upward on the arm 66 tends always to restore it to normal position. After the arm 66 has been depressed by the preliminary turning of the rod 62, the wall 74 which is recessed in the wheel 63 will strike the arm 75 loose on the rod 62, and cause it to move to the position shown in Fig. 10, and at the same time swing arm 76 connected thereto. This arm 76 swings on the element 77 and forces the lower end 78 of the jaw plate 58 to the right to engage the lower run of the chain 33. Since this run, as shown in Fig. 3, is moving from right to left, the frame 22 will be drawn back. Of course, if the motor 25 is reversed, and this run is moving otherwise, the motion of the frame 22 will be accordingly changed. In Fig. 7, the reverse of this operation is shown and thus causes the movement of the frame 22 in the opposite direction for any given direction of movement of the chain 33. In this latter case, the top jaws grip the chain 33. Fig. 8 shows the gripping elements in neutral position, in which case the lock pin 70 is in some one of the frame holes to lock the frame 22. It will be apparent, therefore, that with the chain 33 moving in any given direction, the frame 22 may be moved back and forth merely by turning the handle 61 one way or the other and leaving it in neutral position when the frame arrives at the desired position.

The carrier or extensible chain 49, as seen in Fig. 4, moves up and over at 53 and 79 and the tracks 35 are bent to permit this action, as shown in Fig. 5. These curved tracks or guides are provided with liners 80 to take up the wear.

The compression spring 73 rests between spring seats 81 and 82 (Figs. 13, 14, 19, and 20). The rotating or swinging element 77 comprises generally a pair of blocks 83 and 84, the first fixed to a support plate 85 which supports the jaw plate 57 and is fastened to the frame 21, the second of which is connected by link 86 to the lower end of the jaw plate 58. These blocks have notches 87 therein, in which lie pins 88 on the face of the element 77. It will be seen that as the element 77 is oscillated as above described, the link 86 is moved backward or forward to oscillate the movable jaw plate 58 to engage the upper or lower run of the drive chain 33, as mentioned.

The forward movement of the extensible frame 22 is limited by wheel 89 (Fig. 1) meeting a stop element 90 while the retractable movement is limited by the end of the Z-bar 91 abutting against the upright 92 of the pedestal 26 (Fig. 1).

It will thus be clear that we have a device which can be positioned on a loading platform adjacent a truck which has backed up thereto. When the truck is to be loaded, the operator aligns the frames with the truck body and operates the handle in a manner to cause the frame 22 to move forward into the truck the desired distance. Then the goods traverse the conveyor and need only be lifted off the conveyor and deposited on the floor in the proper place without having to carry the goods along the floor. As the truck is filled up, the handle may be manipulated to withdraw the extension frame desired amounts until the truck body is loaded. In unloading a truck, it is obvious that the reverse of this operation takes place. A switch (not shown) may be placed near the outer end of the frame 22 so as to permit the operator by a mere flick of the hand to reverse the motion of chains as the truck is to be loaded or unloaded. This device requires a minimum of effort on the part of the operator who maintains the end of the extension frame 22 near him within the truck at all times, so that the labor required of him is reduced to a minimum and the speed of loading and unloading is greatly increased.

While the invention has been described in detail and with respect to a present preferred form thereof, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

Having thus described my invention, what I claim as new and desire to secure by Letters Patent is:

1. A conveyor device which comprises a stationary frame, and a movable frame slidable thereon, a drive chain on the stationary frame, a carrier chain on the movable frame, a fulcrumed jaw plate on the movable frame, a jaw at each end of said plate, one jaw being opposite one run of the drive chain and the other jaw being opposite the other one of said drive chain, and manipulatable means on the movable frame to rotate said jaw plate to bring either jaw selectively into and out of contact with its respective run of the drive chain to cause movement of the movable frame with respect to the stationary frame.

2. A conveyor which comprises a stationary frame and a movable frame slidable thereon, a drive chain on the stationary frame, a carrier chain on the movable frame, a movable jaw on the movable frame, and manipulatable means on the movable frame to move said jaw into and out of contact with either run of the drive chain to cause movement of the movable frame with respect to the stationary frame, said carrier chain extending between rear and front sprockets on the fixed frame, spaced sprockets on the movable frame around which the carrier chain passes in a zig-zag path, said last mentioned sprockets being disposed in vertical planes on opposite sides of the front fixed sprocket, the length of the carrier chain between and around said front sprocket and the sprockets on the movable frame being constant and the sum of the distances between said sprockets on the movable frame and the front sprocket always being the same irrespective of the movement of the movable frame.

3. A conveyor device which comprises a fixed frame and a movable frame longitudinally slidable thereon, a motor-driven drive chain on the fixed frame, manipulatable means on the movable frame to selectively engage the upper or lower run of the drive chain to extend or retract the movable frame relative to the fixed frame without reversing the motor, locking means associated with the two frames and operated by the movement of the manipulatable means, said locking means being effective only when said manipulatable means is in normal inoperative position.

4. A conveyor device which comprises a fixed frame and a movable frame longitudinally slidable thereon, a power-driven drive chain on the fixed frame, manipulatable means on the movable frame to selectively engage one of the runs of the drive chain to extend or retract the movable frame relative to the fixed frame without regard to the direction of movement of the drive chain, both frames having associated holes, and a lock pin adapted to be moved into engagement with any pair of registering holes when the manipulatable means is disposed in an inoperative position and to be withdrawn from said pair of holes when the manipulatable means is operated.

HILDING EDWARDS.

REFERENCES CITED

The following references are of record in the file of this patent:

UNITED STATES PATENTS

| Number | Name | Date |
| --- | --- | --- |
| 1,010,297 | Michener | Nov. 28, 1911 |
| 2,150,211 | Edwards | Mar. 14, 1939 |